OR 3,633,996

SEARCH ROOM

[redacted]

[11] 3,633,996

[72] Inventors Eric G. Lean
Mahopac;
Robert V. Pole, Yorktown Heights; Samuel C. Tseng, Ossining, all of N.Y.

[21] Appl. No. 16,445
[22] Filed Mar. 4, 1970
[45] Patented Jan. 11, 1972
[73] Assignee International Business Machines Corporation
Armonk, N.Y.

[54] TWO-DIMENSIONAL ACOUSTO-OPTIC DEFLECTION SYSTEM
6 Claims, 3 Drawing Figs.

[52] U.S. Cl. .......... 350/161, 350/285, 178/7.6, 250/199
[51] Int. Cl. .......... G02f 1/16
[50] Field of Search .......... 350/160, 161, 285, 286; 178/7.6; 250/199

[56] References Cited

UNITED STATES PATENTS 3,461,402 8/1969 Dumanchin .......... 331/94.5
3,510,199 5/1970 Tzuo-Chang .......... 350/160

OTHER REFERENCES

Reich et al. " Photochromic, High-Speed, Large Capacity Semirandom Access Memory," in Optical & Electro-optical Information Processing, M.I.T. Press, 1965, pp. 567–580

Deryugin et al. " Two-Dimensional Light-Beam Scanning by Means of Acoustic Waves" Radio Eng. & Electronic Physics, Vol. 14, No. 12, Dec. 1969, pp. 1891–1894

*Primary Examiner*—Ronald L. Wibert
*Assistant Examiner*—R. J. Webster
*Attorneys*—Hanifin and Jancin and John J. Goodwin

ABSTRACT: A system for deflecting a light beam in two dimensions is described. The system includes a piezoelectric crystal having an acoustic surface wave transducer on its surface for propagating acoustic surface waves on the crystal. Means are provided for applying a nonuniform electric field to the crystal to vary the effective stiffness constant of the crystal in a nonuniform manner. When a beam of laser light is directed onto the crystal it is deflected in one dimension as a function of the frequency of the acoustic wave produced by the transducer and in a second dimension as a function of the nonuniform electric field.

INVENTORS
ERIC G. LEAN
ROBERT V. POLE
SAMUEL C. TSENG

BY John J. Goodwin

ATTORNEY

TWO-DIMENSIONAL ACOUSTO-OPTIC DEFLECTION SYSTEM

BACKGROUND OF THE INVENTION

1. Field of the Invention

The present invention relates to the field of acousto-optics and more particularly to systems for deflecting light beams by acoustic surface waves propagating in a substrate.

2. Description of the Prior Art

Bulk acoustic waves propagated in an acoustic wave column have been used to deflect laser beams in one dimension. U.S. Pat. No. 3,297,876 issued Jan. 10, 1967 to A. J. DeMaria, shows an example of such a system. The present invention is distinct over the prior art in that it employs a single surface acoustic wave transducer to produce deflection to two dimensions.

SUMMARY OF THE INVENTION

An object of the present invention is to provide an acousto-optic system for deflecting a light beam in two dimensions.

Another object of the present invention is to provide a system for deflecting a light beam in two dimensions employing a single surface acoustic wave transducer.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

It is well known that an acoustic wave transducer connected to the surface of an piezoelectric crystal and actuated by a signal source will propagate surface acoustic waves on the crystal surface. The surface acoustic waves thus propagated will produce, in turn, a periodic deformation on the crystal surface. When a light beam such as a laser beam is directed onto the crystal surface, the periodic deformation produced by the acoustic wave functions as a phase grating for the laser beam and, as a result, the laser beam is deflected at an angle determined by the acoustic frequency of the transducer signal. The deflection occurs in the direction in which the acoustic surface waves are propagating at an angle having a magnitude proportional to the acoustic frequency.

The velocity of surface acoustic waves propagating in an elastic medium is proportional to the square root of the stiffness constant of the medium. If a piezoelectric crystal is used as the elastic medium, an electric field applied to the crystal will vary the stiffness constant of the crystal (i.e., stiffen or relax) as a function of variations in the electric field. The variations in the effective stiffness constant of the crystal cause an increase or a decrease in the velocity of the acoustic wave. The aforesaid phenomena are employed in the two-dimensional deflection system of the present invention.

Figure 1:
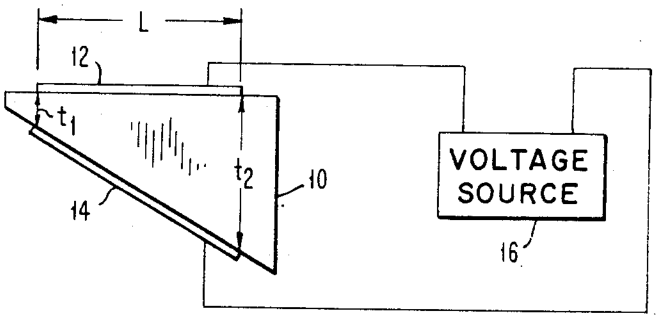
FIG. 1 is an illustration of an embodiment of an acousto-optic system for deflecting light in two dimensions wherein an electric field gradient is produced in part by the geometrical shape of the crystal.

Referring to FIG. 1, a first technique for providing a varied electric field on a piezoelectric crystal is shown. An end view of the crystal 10 illustrates that the crystal varies linearly in thickness from one side to the other. A first electrode 12 is affixed to the top surface of crystal 10 and a second electrode 14 is connected to the bottom surface of crystal 10. Electrodes 12 and 14 are connected to a voltage source 16 which provides a voltage to change the effective stiffness of crystal 10. Due to the differences in thickness, the amount of change in stiffness will vary from one side of the crystal to the other side. When a surface acoustic wave of width L is propagated on the upper surface of crystal 10, the wave velocity will be faster in the region where the thickness in $t_1$ than in the region where the thickness is $t_2$.

Figure 2:
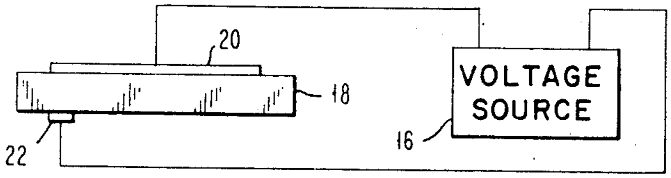
FIG. 2 is another embodiment of a system for deflecting light in two dimensions wherein an electric field gradient is produced in part by the geometrical shape of the electrodes.

Another technique for providing a nonuniform distribution of electric field across a piezoelectric crystal is shown in FIG. 2. In this embodiment the crystal 18 has uniform thickness; however, the upper electrode 20 is larger in size than the lower electrode 22. An acoustic surface wave propagating on the upper surface of crystal 18 will have a faster or slower wave velocity at the side where electrode 22 is located depending on the polarity of the applied voltage and the wave velocity will correspondingly decrease or increase from left to right across the surface of crystal 18 depending on the polarity of the voltage.

Crystals 10 and 18 may be constructed from lithium niobate, zinc oxide, cadmium sulfide, bismuth germanium oxide or the like. Electrodes 12, 14, 20 and 22 may be of any conductive material such as aluminum or copper for reflected light deflection. Transparent conductive material such as tin oxide may be used for transmitted light deflection.

Figure 3:
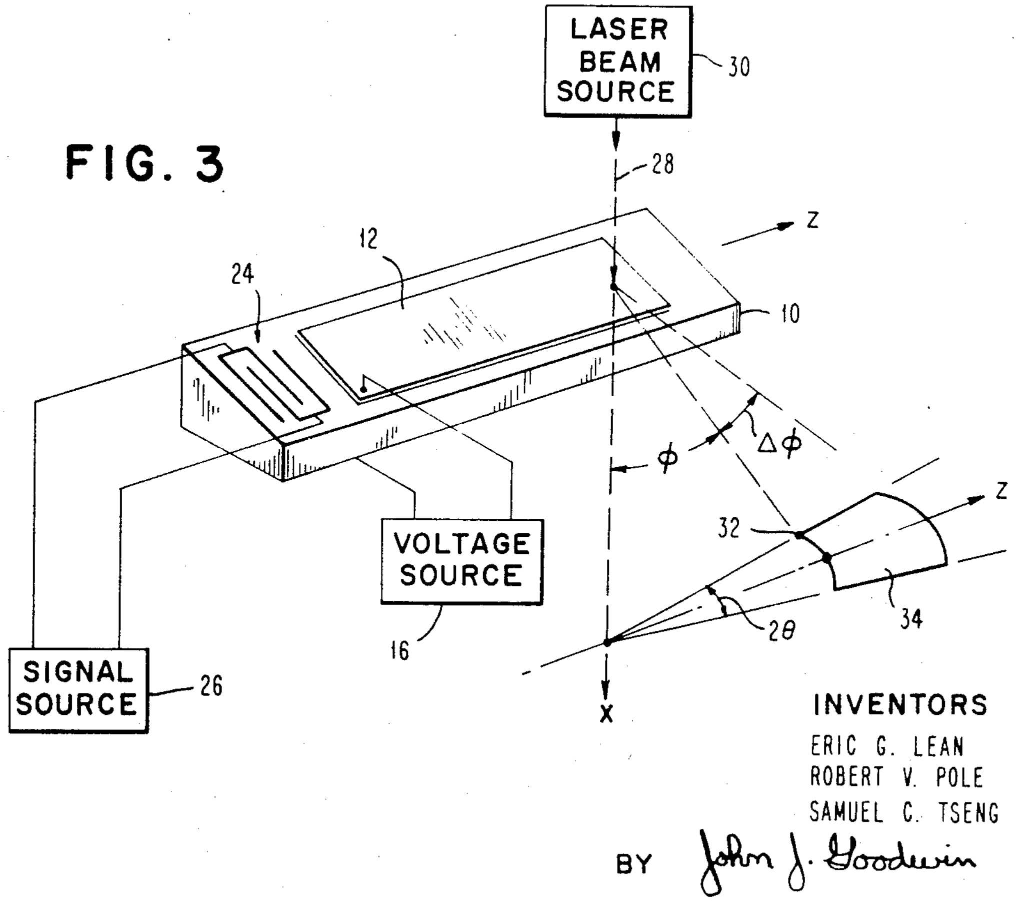
FIG. 3 is a perspective view of a system for deflecting light in two dimensions showing the paths of light deflection.

Referring to FIG. 3, the complete system for two-dimensional deflection of a light beam is shown. The system of FIG. 3 employs the technique of FIG. 1 for providing a nonlinear electric field across the crystal 10. In FIG. 3 a piezoelectric crystal is provided having a linear variation in thickness from side to side as described in relation to FIG. 1. An acoustic transducer 24 is provided which is preferably an interdigital transducer consisting of at least two interleaved metallic combs fabricated on the upper surface of crystal 10 by photoresist techniques. Acoustic transducer 24 is connected to a suitable signal source 26 which causes transducer 24 to propagate surface acoustic waves on the surface of crystal 10 in the direction of the Z-axis indicated in FIG. 3. An upper electrode 12 and a lower electrode 14 (not visible) are connected to crystal 10 in a manner shown in FIG. 1. A laser beam 28 from a source 30 is directed onto electrode 12 in the direction of the X-axis normal to the crystal 10 and is transmitted through the crystal. When no voltage is applied across electrodes 12 and 14 the surface acoustic waves propagating in the crystal in the Z-direction cause surface deformations that act as a diffraction grating and the laser beam 28 is deflected as it is transmitted through the crystal at an angle in the X,Z-plane. The angle of deflection is dependent on the acoustic wavelength of the surface waves which in turn are dependent on the frequency of the signals from source 26.

A voltage is applied across electrodes 12 and 14 from voltage source 16 and produces a nonuniform electric field in crystal 10. Crystal 10 is stiffened in a corresponding nonuniform manner with the effect that the velocity of the acoustic surface wave is greater at the thinner side of crystal 10 than at the thicker side. Consequently, the portion of the wave front having the greater velocity moves ahead of the portion having a smaller velocity. Since the electric field on the crystal is a gradient, the acoustic wave front propagates in a deflected manner. That is, the wave front will turn or deflect toward the thicker side of the crystal rather than propagate in the Z-direction. Laser beam 28 will no longer be deflected in the X,Z-plane. but will deflect in the same direction as the direction of propagation of the acoustic wave front. The amount that beam 28 is deflected away from the X,Z-plane is dependent on the amplitude of the voltage of source 16. The polarity of the voltage applied to electrodes 12 and 14 determines whether crystal 10 is stiffened or relaxed; and therefore, determines whether the acoustic wave front is deflected to the left or the right of the Z-axis.

In FIG. 3, beam 28 is shown deflected to a point 32. The beam is deflected at an angle $\phi$ from the X-axis as a function of the wavelength of the acoustic wave and is deflected an an angle $\theta$ from the Z-axis as a function of the magnitude of the voltage from source 16.

The expression for the deflection value $\theta_n$, that is the radial deflection of the beam 28 due to the wave front direction resulting from the electric field is as follows:

$$\theta_n = n\frac{\lambda_0}{L}\frac{\Delta v}{v_0}\left[1-\frac{t_1}{t_2}\right]$$

where $n$ is the number of propagated wavelengths;

$\lambda_o$ and $v_o$ are respectively the wavelength and the phase velocity of the acoustic waves in the crystal without an applied electric field;

$L$ is the width of the wave front;

$t_1$ and $t_2$ are the thicknesses of the crystal measured at the two ends of width $L$; and $\Delta v$ is the deviation of the velocity from $v_o$.

The expression for the deflection of beam 28, due to the surface deformations produced by the acoustic wave, is as follows:

$$\sin \phi_m = m\frac{\lambda_c}{\lambda}$$

where $m$ is the diffraction order (integer);

$\lambda_c$ is the wavelength of the light of the laser beam; and $\lambda$ is the wavelength of the acoustic waves with an applied electric field.

The preceding discussion described how beam 28 could be deflected to a given point by a constant frequency signal from source 26 and a constant voltage from source 16. The beam 28 can be made to scan over a given area, such as area 34 in FIG. 3, by varying the frequency of the signal from source 26 and varying the voltage from source 16. Thus, if source 26 generated a frequency-modulated signal and if source 16 produced a varying polarity voltage, such as a bipolar triangular wave or sawtooth wave, the beam 28 will be deflected constantly in an area such as area 34 determined by the angles $\Delta\phi$ $2\theta$.

What has been described is a two-dimensional light deflection system wherein light is deflected in one direction due to surface deformation produced on a crystal by surface acoustic waves and in a second direction by changing the direction of the surface acoustic waves by applying a nonuniform electric field to the crystal. In the embodiment of FIG. 3, the beam 28 is deflected as it is transmitted through the crystal. The beam 28 can also be reflected at a deflected angle by making the electrode 12 reflective.

The two-dimensional light beam deflection system of the present invention may also be positioned inside a laser cavity to deflect and modulate the laser light reflected in the cavity.

While the invention has been particularly shown and described with reference to preferred embodiments thereof, it will be understood by those skilled in the art that various changes in form and details may be made therein without departing from the spirit and scope of the invention.

What is claimed is:

1. A system for deflecting a light beam in two dimensions comprising:

a piezoelectric crystal in the path of said light beam, means connected to said crystal for propagating a surface acoustic wave in said crystal in a given direction for producing surface deformations on said crystal, and means connected to said crystal for applying a nonuniform electric field on said crystal for changing the direction of the wave fronts of said surface acoustic wave, said light beam being deflected at a first angle in one dimension determined by said surface deformations and at a second angle in a second dimension determined by the direction of said wave fronts of said acoustic wave producing said surface deformations.

2. A system for defecting a light beam in two dimensions according to claim 1, wherein said light beam is a laser beam.

3. A system for deflecting a light beam in two dimensions according to claim 1, wherein said means for propagating a surface acoustic wave in said crystal includes an acoustic surface wave transducer connected to said crystal and an alternating current signal source connected to said acoustic surface wave transducer.

4. A system for deflecting a light beam in two dimensions according to claim 3, wherein said crystal has a top surface, a bottom surface and at least two sides and wherein said means for applying a nonuniform electric field on said crystal includes a first electrode connected to one surface of said crystal and extending substantially the same width as the width of said acousto-optic transducer, a second electrode connected to the other surface of said crystal proximate to one of said sides and having a width substantially smaller than that of said first electrode, and a voltage source connected to said first and second electrodes.

5. A system for deflecting a light beam in two dimensions according to claim 3 wherein said crystal has a top surface, a bottom surface and at least two sides and a nonuniform thickness, the thickness at one of said sides being substantially greater than the thickness at the other side;

and wherein said means for applying a nonuniform electric field on said crystal includes a first electrode connected to one of said crystal surfaces, a second electrode connected to the other surface, surface, and a voltage source connected to said first and second electrodes.

6. A system for deflecting a light beam in two dimensions according to claim 5 wherein said signal source connected to said acoustic surface wave transducer generates a signal having a varying frequency and wherein said voltage source connected to said first and second electrode produces a voltage of varying amplitude.

* * * * *